(12) United States Patent
Jule et al.

(10) Patent No.: US 6,494,403 B2
(45) Date of Patent: Dec. 17, 2002

(54) DEVICE FOR AIRCRAFT THRUST RECOVERY CAPABLE OF LINKING A TURBOSHAFT ENGINE AND AN ENGINE STRUT

(75) Inventors: Pascal Jule, Tournefeuille (FR); Stéphane Levert, Toulouse (FR)

(73) Assignee: Eads Aribus SA, Paris (FR)

( * ) Notice: Subject to any disclaimer, the term of this patent is extended or adjusted under 35 U.S.C. 154(b) by 0 days.

(21) Appl. No.: 09/805,051

(22) Filed: Mar. 14, 2001

(65) Prior Publication Data
US 2001/0025902 A1 Oct. 4, 2001

(30) Foreign Application Priority Data
Mar. 22, 2000 (FR) .............................. 00 03636

(51) Int. Cl.$^7$ .............................................. B64D 27/00
(52) U.S. Cl. .................. 244/54; 248/554; 60/39.31
(58) Field of Search .................. 244/54, 55; 60/39.31; 248/554, 555

(56) References Cited

U.S. PATENT DOCUMENTS

| 5,078,342 A | * | 1/1992 | Langley et al. ............... 244/54 |
| 5,275,357 A | * | 1/1994 | Seelen et al. ................. 244/54 |
| 5,320,307 A | * | 6/1994 | Spofford et al. .............. 244/54 |
| 5,620,154 A | * | 4/1997 | Hey ............................. 244/54 |
| 5,725,181 A | * | 3/1998 | Hey ............................. 244/54 |
| 5,860,623 A | * | 1/1999 | Dunstan et al. ............... 244/54 |
| 5,873,547 A | * | 2/1999 | Dunstan ....................... 244/54 |
| 5,921,500 A | * | 7/1999 | Ellis et al. .................... 244/54 |
| 5,927,644 A | * | 7/1999 | Ellis et al. .................... 244/54 |
| 6,296,203 B1 | * | 10/2001 | Manteiga et al. ............. 244/54 |

FOREIGN PATENT DOCUMENTS

| EP | 0564126 | | 10/1993 | |
| EP | 0805108 | | 11/1997 | |
| EP | 0879759 | | 11/1998 | |
| WO | WO 96/18538 | * | 6/1996 | .................. 244/54 |

* cited by examiner

Primary Examiner—Michael J. Carone
Assistant Examiner—Lulit Semunegus
(74) Attorney, Agent, or Firm—Thelen Reid & Priest LLP; Robert E. Krebs

(57) ABSTRACT

Device for aircraft thrust reovery capable of linking a turboshaft engine and an engine strut.

A device for thrust recovery (16) linking a turboshaft engine to an aircraft engine strut comprising an attachment fitting (22) fixed to an engine strut, a control bar (38) articulated on the attachment fittings (22) and two coupling rods (24) linking the control bar (38) to the central engine casing, almost along the longitudinal axis of the latter. Links with play are envisaged between each of the coupling rods (24) and the attachment fitting (22), to ensure transmission of thrust forces in the event of rupture of one of the parts of the device. These links with play comprise pivoting axes (48) which intersect the longitudinal axes of the corresponding coupling rods (24).

6 Claims, 2 Drawing Sheets

DEVICE FOR AIRCRAFT THRUST RECOVERY CAPABLE OF LINKING A TURBOSHAFT ENGINE AND AN ENGINE STRUT

TECHNICAL FIELD

The present invention relates to a device for thrust recovery, conceived for linking a turboshaft engine and an aircraft engine strut, so as to ensure transmission of the thrust forces of the turboshaft engine to the structure of the aircraft.

In the text as a whole, the terms "front" and "rear" refer to the direction of the airflow in the turboshaft engine, from the front to the rear.

PRIOR ART

Turboshaft engines ensuring propulsion of aircraft are usually mounted under the wings or inside the tail unit, through the intermediary of an engine strut. The link between the. engine and the strut is ensured by two or three linkage devices designed to transmit to the aircraft structure, through the engine strut, the thrust of the engine. These thrusts comprise vertical loads such as the weight of the engine, axial loads resulting from the thrust produced by the engine, lateral loads due in particular to turbulence produced by the wind, and roll loads or torques resulting from the rotation of the engine. The linkage devices must also absorb the dimensional modifications due to axial and radial expansions and contractions of the engine relative to the engine strut.

Generally, at least one of the linkage devices of the turboshaft engine is dedicated, at least partially, to transmission of the thrust forces. This device, usually situated at the rear of the engine, usually comprises a fitting attached to the engine strut, an articulated control bar on the attachment fitting in its central part, as well as two coupling rods linking the ends of the control bar to a structural element of the turboshaft engine, offset towards the front in relation to the attachment fitting. The two coupling rods are oriented almost along the thrust direction of the turboshaft engine.

In order to ensure transmission of the thrust forces even in the event of rupture of a part, the linkage devices fulfilling this function usually comprise a main linkage structure and a security backup linkage structure. The main linkage structure ensures transmission of thrust in normal operating conditions, that is to say when all the parts of the linkage device are intact. The security linkage structure is then inactive. On the other hand, the security linkage structure ensures transmission of thrust between the engine and the aircraft if there is a failure of one of the parts of the main linkage structure.

Document EP-A-0 564 126 describes a device for thrust recovery comprising a main linkage structure and a safety linkage structure. In conventional manner, the main linkage structure comprises an attachment fitting fixed on the engine strut and two coupling rods for transmission of thrust linked to the attachment fitting by a control bar. The security linkage structure comprises two lateral fork shaped yokes on the attachment fitting, in which the extensions of the pivoting axes are received with play through which the coupling rods are articulated on the ends of the control bar.

This thrust recovery device is usually satisfactory. However, it has the inconvenience of having to transit the thrust force along the same pivoting axes both in normal operational conditions and in the case of rupture of one of the parts.

Document EP-A-0 805 108 also describes a thrust recovery device comprising a main linkage structure and a safety linkage structure. The main linkage structure is of the same type as that used in document EP-A-0 564 126. The safety linkage structure comprises a supplementary pivoting axis interposed between the attachment fitting and the control bar, crossing the latter with a predetermined play.

This thrust recovery device has the main inconvenience of becoming non-operational when there is breakage of the control bar. In these conditions, the device no longer ensures recovery of the thrust forces and there is a great risk of losing the engine.

Document EP-A-0 879 759 also describes a thrust recovery device comprising a main linkage structure and a safety linkage structure. The main linkage structure is of the same type as that used in the preceding documents. The safety linkage structure comprises pins formed on the ends of the coupling rods articulated on the control bar. These pins enter with play into longitudinal grooves formed in the lugs integral with the attachment fitting.

This device needs to be dimensioned in order to transmit the thrusts correctly. This results in higher weight in relation to the thrust recovery device described in the preceding document.

DESCRIPTION OF THE INVENTION

The objective of the invention is a device for thrust recovery designed to ensure the link between a turboshaft engine and an engine strut of an aircraft, this device being fitted in such a way that it has reduced mass and dimensions and ensures the transmission of the thrust force even in the event of rupture of any one of the parts constituting it.

According to the invention this result is obtained by means of a thrust recovery device, capable of linking a turboshaft engine and an engine strut of an aircraft, the device comprising:

an attachment fitting able to be fixed to the engine strut, said attachment fitting comprising a central yoke and two lateral yokes;

a control bar containing a central part articulated on the central yoke of the attachment fitting by a first pivoting axis; and two coupling rods oriented almost along the direction of the turboshaft engine thrust and each comprising a front end able to be articulated on the turboshaft engine and a rear yoke, articulated by a second pivoting axis on a lateral extremity corresponding to the control bar;

said device being characterised in that the rear yoke of each of the coupling rods is also articulated on one of the lateral yokes of the attachment fitting, by a link with play comprising a third pivoting axis.

In this device, the security linkage structure comprises pivoting axes distinct from those which are used by the main linkage structure. In addition, the thrust force recovery is ensured even in the hypothesis of rupture of the control bar, wherever the zone of this rupture is located.

According to a preferred embodiment, the second and third pivoting axes intersect the longitudinal axis the corresponding coupling rod.

Preferably, the lateral yokes of the attachment fittings are male yokes and the rear yokes of the coupling rods are female yokes.

Advantageously, the lateral ends of the control bar the n enter the female yokes of the coupling rods, in front of the lateral yokes of the attachment fittings.

Preferably, the first, second and third pivoting axes are parallel to each other.

In the preferred embodiment of the invention, the central yoke of the attachment fitting is also a female yoke receiving the central part of the control bar.

BRIEF DESCRIPTION OF THE DRAWINGS

The following is a non-limiting example describing a preferred embodiment of the invention, referring to the attached drawings, in which.

DETAILED DESCRIPTION OF A PREFERRED EMBODIMENT OF THE INVENTION

Figure 1:
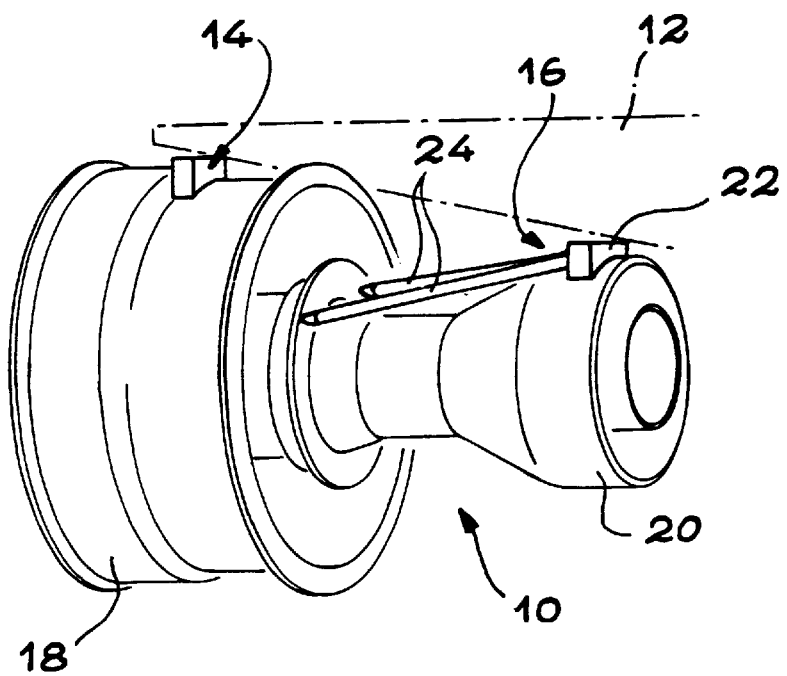
FIG. 1 is a perspective view representing schematically the linkage between a turboshaft engine of an aircraft and an engine strut by means of two linkage devices comprising a thrust recovery device according to the invention.

As illustrated very schematically in figure. 1, according to a conventional mounting generally called "hybrid fan mounting", the linkage between a turboshaft engine 10 and an engine strut 12 equipping an aircraft can in particular be ensured by a front linkage device 14 and a rear linkage device 16. In order to aid understanding, only the fan casing 18 of the nacelle is represented and the engine strut 12 is illustrated by lines of dots and dashes.

The front linkage device 14 is interposed between the engine strut 12 and the fan casing 18 of the turboshaft engine 10. This device 14, well known to those skilled in the art, can be produced in any manner, without going beyond the framework of the invention. Therefore no detailed description will be given.

The rear linkage device 16 comprises a device for thrust recovery according to the invention. It is designed in particular to transmit to the engine strut 12 the thrust forces exercised by the turboshaft engine 10. This device 16 is interposed between the engine strut 12 and the central casing 20 of the turboshaft engine 10. This device 16 comprises in particular an attachment fitting 22, fixed to the engine strut 12 at the level of the rear part of the central casing 20, and two coupling rods 24 linking the attachment fitting 22 to the front part of the central casing 20. The coupling rods 24 thus extend in a direction which is almost parallel to the direction of thrust of the turboshaft engine, oriented along the longitudinal axis of the turboshaft engine 10.

The thrust recovery device 16 according to the invention will now be described in detail with reference to FIGS. 2 and 3.

The attachment fitting 22 is designed to be fixed to the engine strut 12 by conventional fixation means, well known to those skilled in the art. These fixation means comprise in particular a plurality of bolts (not shown) which freely cross through a certain number of holes 26 made in the attachment fitting 22.

The attachment fitting 22 extends along a transversal direction, orthogonal to the longitudinal axis of the turboshaft engine 10. At each of its lateral ends, the attachment fitting 22 comprises a female yoke 28. One end of a small connecting rod 30 is received in each of the female yokes 28 and articulated relative to this by a pivoting axis 32 oriented almost parallel to the longitudinal axis of the turboshaft engine 10. The opposite end of each of the small connecting rods 30 is received in a female yoke (not shown) formed on the central casing 20 of the turboshaft engine and linked to said yoke by a pivoting axis (not shown) parallel to the pivoting axis 32. Advantageously, ball joints (not shown) are interposed between the pivoting axes and the small connecting rods 30 in order to allow relatives movements between the attachment fitting 22 and the turboshaft engine 10 in directions other then circumferential.

The general layout described above makes it possible, in a conventional way, to transmit to the engine strut 12 the forces and roll torques resulting from the rotation of the engine around the linkage devices 14 and 16.

Figure 2:
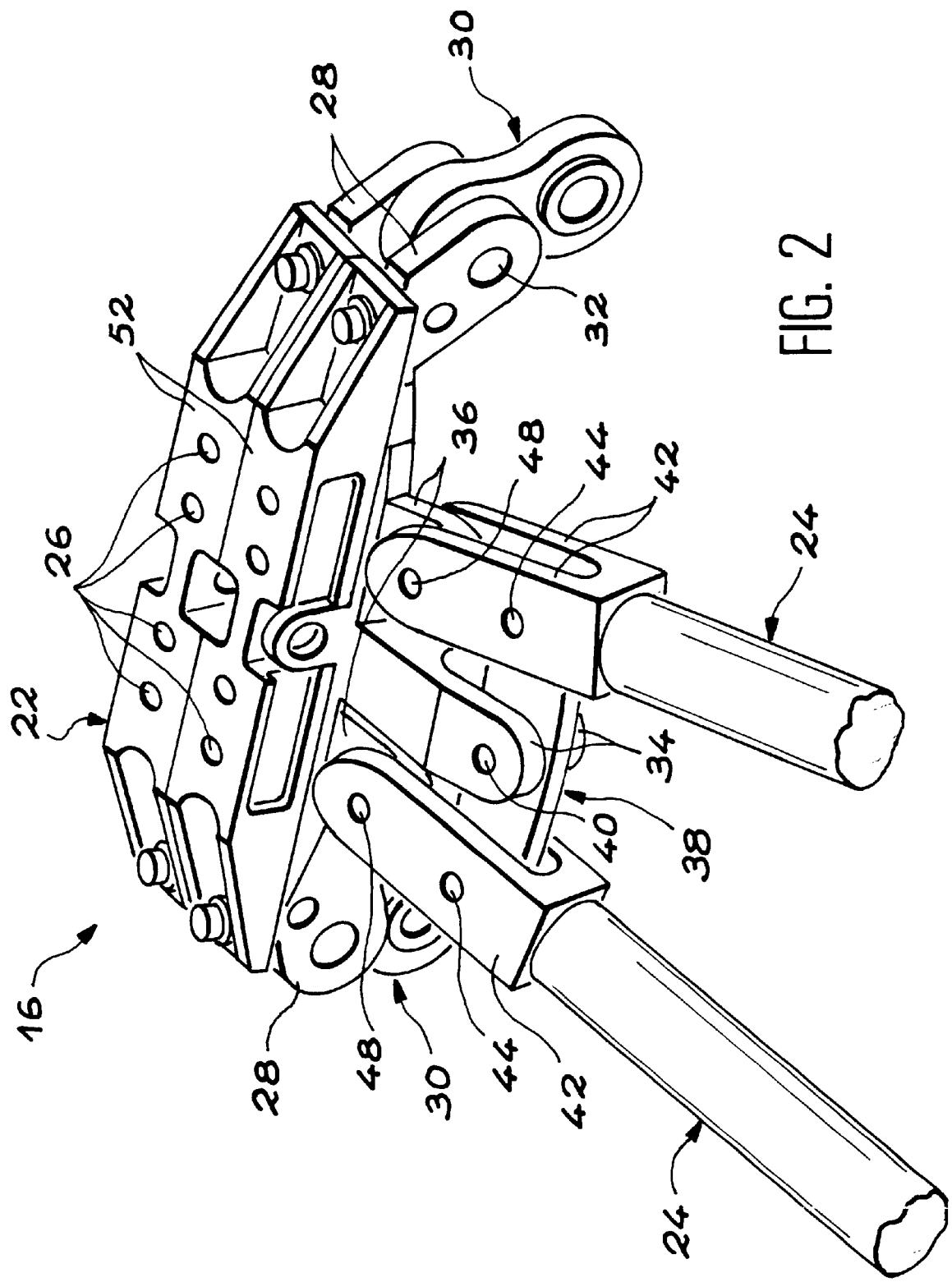
FIG. 2 is a perspective view on a larger scale, representing, from the rear to the front, the main part of the thrust recovery device according to the invention.

As shown in FIG. 2, the attachment fitting 22 presents, on its front face turned towards the fan casing 18, a central female yoke 34 and two lateral male yokes 36. For a reason which will become clearer later, the central yoke 34 stands out over a greater distance than the lateral yokes 36.

The thrust recovery device also comprises a control bar 38 whose central part is articulated on the central yoke 34 of the attachment fitting 22 by a pivoting axis 40. More precisely, the central part of the control bar 38 is received in the female yoke 34 and is traversed together with it, by the pivoting axis 40. This pivoting axis 40 links the control bar 38 to the attachment fitting 22 through an articulated linkage without play. The pivoting axis 40 is oriented along a direction almost radial to the longitudinal axis of the turboshaft engine 10.

As shown schematically in FIG. 1, the front end of each of the coupling rods 24 is articulated on a front part of the central casing 20 of the engine 10, for example at the level of the rear end of the fan casing 18.

The rear end of each of the coupling rods 24 forms a female yoke 42 (FIGS. 2 and 3), by which said coupling rod is articulated on the end corresponding to the control bar 38. More precisely, the ends of the control bar 38 are received at the bottom of the yokes 42 and are traversed together by the pivoting axes 44. These pivoting axes 44 are oriented parallel to axis 40.

The linkages formed between the control bar 38 and each of the yokes 42 are articulated linkages without play. Under normal operating conditions, these linkages without play ensure transmission to the engine strut 12 of the thrust forces from the engine, through the coupling rods 24, the control bar 38 and the attachment fitting 22.

Figure 3:
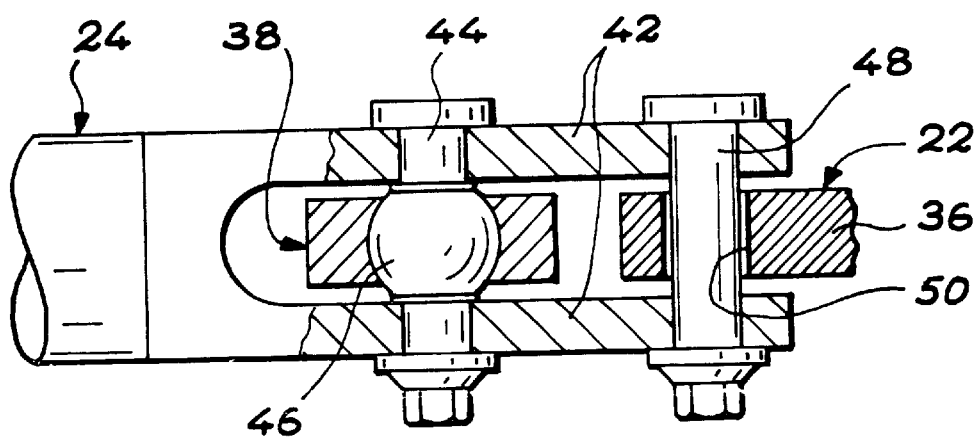
FIG. 3 is a longitudinal cross-section view representing the linkage between the end of one of the coupling rods of the device, the control bar and the attachment fitting.

As shown in particular in FIG. 3, each of the pivoting axes 44 is advantageously mounted in the control bar 38 through the intermediary of a ball joint 46. An analogous mounting is advantageously envisaged between the pivoting axis 40 and the control bar 38. This layout makes it possible to avoid forces other than thrust forces being transmitted through the coupling rods 24.

According to the invention, each of the lateral yokes 36 of the attachment fitting 22 enters into a extension towards the rear of the yoke 42 formed on the corresponding coupling rod 24. In addition, a pivoting axis 48 transverses each of the assemblies formed by a lateral yoke 36 and a rear yoke 42, in such a way as to define a linkage with play between the attachment fitting 22 and each of the coupling rods 24.

The pivoting axes 44 and 48 are almost parallel to the pivoting axis 40 of the control bar 38 on the attachment fitting 22, near to the travel of the ball joints.

As shown in more detail in FIG. 3, each of the pivoting axes 48 is fixed to the end yoke 42 of the corresponding connecting rod 24 and, with predetermined play, transverses a hole 50 formed in the lateral yoke 36 of the attachment fitting 22. The play thus formed between the pivoting axis 48 and the hole 50 is determined taking into account the different travel possible between these parts such as differential expansions and movements of the engine in relation to the linkage devices 14 and 16, so that no force is transmitted by the pivoting axis 48 in normal operating conditions of the device.

In other terms, when none of the parts of the device is damaged, the control bar 38 balances the thrust forces transmitted to the engine strut through the intermediary of the two coupling rods 24, the pivoting axis 40 and the attachment fitting 22. The plays existing between the pivoting axes 48 and the holes 50 are then such that no force is transmitted by these pivoting axes 48.

In the hypothesis of a rupture of the control bar 38, the pivoting axis 40 or the central yoke 34, the forces due to the thrust of the engine are taken over by one or other of the two coupling rods 24 through the pivoting axes 48 and the yokes 36. In fact, the play which initially exists between these parts is annulled in the thrust direction, so that these linkages can work.

In the hypothesis of failure of a coupling rod 24 or the yoke 42 of one of these, the forces due to the thrust are transmitted directly and integrally to the engine strut 12 by the other coupling rod 24 through the pivoting axis 48 and the yoke 42, in the same way as described above. Since the control bar 38 is no longer balanced, it moves and no longer takes part in the transmission of thrust forces.

Finally, in the hypothesis of failure of one of the pivoting axes 44 linking the coupling rods .24 to the control bar 38, the forces due to the thrust pass via the pivoting axis 48 and the yoke 36 in the same way as described above.

It is to be noted that the pivoting axes 44 and 48 of each of the coupling rods 24 intersect the latter longitudinal axis. Consequently, the thrust forces use an identical path in normal operation and in security operation. Thus no parasitic force is created in the device when one of the parts constituting it fails.

According to a conventional layout, also illustrated in FIG. 2, the attachment fitting 22 is formed out of at least two distinct parts 52 (FIG. 2) bolted together. Each of these parts is able to transmit to the engine strut 12 the forces applied to the attachment fitting 22, in the case of rupture of the other part.

To resume, the device for thrust recovery according to the invention makes it possible to ensure the transmission of thrust forces from the engine to the aircraft structure in all hypotheses of failure of any part of this device. An active linkage between the engine and the aircraft is also preserved under all circumstances.

Moreover it is to be noted that this result is obtained by means of a device whose mass and dimensions remain limited.

Evidently, the invention is not limited to the embodiment that has just been described as an example. Thus, it is easy to understand that the male and female yokes can be reversed, without going beyond the framework of the invention. In the same way, instead of being fixed to the yokes 42 and traversing the yokes 36 with play, the pivoting axes 48 can be fixed to the yokes 36 and traverse the yokes 42 with play. Finally, the term "yoke" can be understood in its widest meaning and cover, in particular, for the lateral yokes 36, the case where the extremities of the yokes 42 enter the notches provided in the attachment fitting 22 and are articulated directly in it.

What is claimed is:

1. A thrust recovery device linking a turboshaft engine and an engine strut of an aircraft, comprising:

an attachment fitting connected to the engine strut, said attachment fitting comprising a central yoke and two lateral yokes;

a control bar containing a central part pivotally connected to the central yoke of the attachment fitting about a first pivoting axis; and two coupling rods oriented almost along the direction of the turboshaft engine thrust, each coupling rod comprising a front end coupled to the turboshaft engine and a rear yoke pivotally joined to a lateral extremity of the control bar about a second pivoting axis and pivotally joined with play to one of the lateral yokes of the attachment fitting about a third pivoting axis, said third pivoting axis being non-coaxial to the second pivoting axis.

2. The device according to claim 1, wherein each of the coupling rods has a longitudinal axis and the second the second and third pivoting axes intersect said longitudinal axis.

3. The device according to claim 1, wherein the lateral yokes of the attachment fitting are male yokes and the rear yokes of the coupling rods are female yokes.

4. The device according to claim 3, wherein the lateral extremities of the control bar enter into the female yokes of the coupling rods, in front of the lateral yokes of the attachment fitting.

5. The device according to claim 1, wherein the first, second and third pivoting axes are parallel to each other.

6. The device according to claim 1, wherein the central yoke of the attachment fitting is a female yoke, which receives the central part of the control bar.

* * * * *